United States Patent [19]

Johnson

[11] Patent Number: 4,707,267
[45] Date of Patent: Nov. 17, 1987

[54] DEVICE AND METHOD FOR SEPARATING INDIVIDUAL FLUIDS FROM A MIXTURE OF FLUIDS

[75] Inventor: Homer K. Johnson, Antioch, Calif.

[73] Assignee: The Dow Chemical Company, Midland, Mich.

[21] Appl. No.: 5,803

[22] Filed: Jan. 22, 1987

[51] Int. Cl.⁴ ............................................. B01D 13/01
[52] U.S. Cl. ................................ 210/650; 29/157 R; 29/434; 55/16; 55/158; 210/321.1; 210/321.72; 210/321.8
[58] Field of Search ...................... 55/16, 158; 29/419, 29/434, 157 R; 210/640, 650–655, 321.1, 321.2, 321.3, 321.4, 321.5, 433.2, 500.23, 323.2; 422/48

[56] References Cited
U.S. PATENT DOCUMENTS 3,422,008  1/1969  McLain ............................... 210/655
4,261,829  4/1981  Spranger ........................... 210/321.1
4,508,548  4/1985  Manatt ..................................... 55/16

Primary Examiner—Ivars Cintins
Attorney, Agent, or Firm—V. Dean Clausen

[57] ABSTRACT

A device and method is disclosed for separating individual fluids (particularly gases) from a stream that contains more than one fluid. The separator device is made up of a bundle of hollow fibers, which are fastened at each end into a resin tubesheet. The fiber bundle is enclosed in a casing and in the center of the bundle is a perforated, distributor tube. The pressure load on one tubesheet is carried by a movable flange in contact with the tubesheet. At the other end of the separator the pressure load is carried by a stationary flange that seats against the tubesheet. Pressurized fluid directed into the distributor tube flows into the fiber bundle. The permeate fluids pass through the fiber walls and are carried out of the separator through outlets at each end. The nonpermeate fluids bypass the fibers and are carried out of the separator through one or more outlets in the casing.

3 Claims, 4 Drawing Figures

DEVICE AND METHOD FOR SEPARATING INDIVIDUAL FLUIDS FROM A MIXTURE OF FLUIDS

BACKGROUND OF THE INVENTION

This invention relates to a device for separating individual fluids from a fluid stream that contains a mixture of permeate and nonpermeate fluids. The fluids are separated by hollow fiber members, in which the permeate fluids penetrate the walls of the hollow fibers and are carried to a collection point. The nonpermeate fluids bypass the fibers and are collected at another point.

There are several conventional devices designed for separating one fluid from another in a mixture of fluids. One of these devices, known as a Generon ® air separation system (The Dow Chemical Company), is specifically designed for separating oxygen and nitrogen from a stream of air. The basic system consists of a bundle of hollow polyolefinic fibers, arranged in parallel fashion. At each end of the fiber bundle the fibers are held together by an epoxy resin tubesheet and the bundle encloses a perforated distributor tube that extends lengthwise through the bundle. The fiber bundle structure fits inside of a metal cylinder (case), so that space is defined between the periphery of the fiber bundle and the case, and between the front face of the tubesheets and the plates that close each end of the cylinder.

In a typical operation of this device, air at high pressure is passed into the open end of the distributor tube (the other end is plugged shut). As the air moves through the distributor tube it slows out of the perforations in the tube and passes into the fiber bundle. The oxygen component readily permeates the walls of the fibers and moves along the fiber bores to discharge outlets at each end of the cylinder. But the nitrogen component won't readily permeate the fiber walls. As a nonpermeate fluid, therefore, the nitrogen bypasses the fibers and is discharged through an outlet at the top of the cylinder.

The air separation module described above is not entirely satisfactory from a design standpoint. When the pressurized air moves into the fiber bundle, the force acting against the backside of each tubesheet causes the tubesheets to bend back and forth (that is, to deflect), because there is no balancing force on the front side of each tubesheet. The deflection puts a considerable amount of stress on the tubesheets at the point where they are joined to the distributor tube. Since the "connection" point is only a small area of each tubesheet, the tubesheet will frequently crack at this juncture, or at some other place.

The present invention overcomes the problem described above. In the embodiment of the invention illustrated herein the deflection of each tubesheet, caused by the pressure acting against its backside, is reduced by providing a physical support at the periphery of the tubesheet. A reduction in deflection equates directly to a reduction in stress, and thus eliminates cracking. At one end of the fiber bundle, the physical support is fixed; at the other end the support is adjustable, to provide for fiber bundles of varying length.

SUMMARY OF THE INVENTION

The invention is a hollow fiber device for separating individual fluids from a fluid stream that contains a mixture of permeate and nonpermeate fluids. In the description of this invention permeate fluids are defined as fluids that penetrate the walls of the hollow fibers described herein at a faster rate than the nonpermeate fluids. Nonpermeate fluids are defined as fluids that penetrate the fiber walls at a slower rate than the permeate fluids. Basic components of the separation device include an elongate housing and a hollow fiber module that fits inside the housing. The module consists of an elongate, perforated distributor tube enclosed by a bundle of spaced-apart hollow fibers. One end of the distributor tube is open, the other end is closed. At each end of the bundle the fibers fasten into a tubesheet fabricated of a resin material.

At one end of the housing is a movable flange, which can move forward and backward inside the housing. The flange has an inside face with a rib member thereon that is in contact with the tubesheet at that end of the housing. A space is defined between the part of the flange face not occupied by the rib and the tubesheet. An adjustment ring threads into the housing adjacent to the movable flange, and this ring can move backward or forward inside the housing, so it can adjust the position of the movable flange. At the other end of the housing is a stationary flange that fits inside the housing. This flange also has an inside face with a rib member in contact with the other tubesheet. And a space in also defined between the part of the flange face not occupied by the rib and the tubesheet at that end of the housing.

A space is defined between the external surface of the bundle and the housing and a fluid outlet in the housing communicates with this space. A second fluid outlet extends through the stationary flange and communicates wih a space between this flange and the adjacent tubesheet. A third fluid outlet extends through the movable flange and communicates with a space between the adjacent tubesheet and the face of the movable flange.

In the operation of the separator device, a fluid stream containing permeate and nonpermeate fluids is directed into the open end of the distributor tube under pressure. From the distributor tube the permeate fluid moves through the walls of the hollow fibers in the bundle and is carried out of the separator device through the second and third fluid outlets. But, the nonpermeate fluid moves through the spaces between the fibers and is carried out of the separator device through the first fluid outlet. The operating location for the movable flange is set by turning the adjustment ring inwardly until the rib members on the stationary and movable flanges are in contact with the tubesheets. By noting the degrees of rotation of the adjustment ring, the ring's position can allow for gap, no gap, or interference (pre-load).

DESCRIPTION OF THE INVENTION

Figure 1:
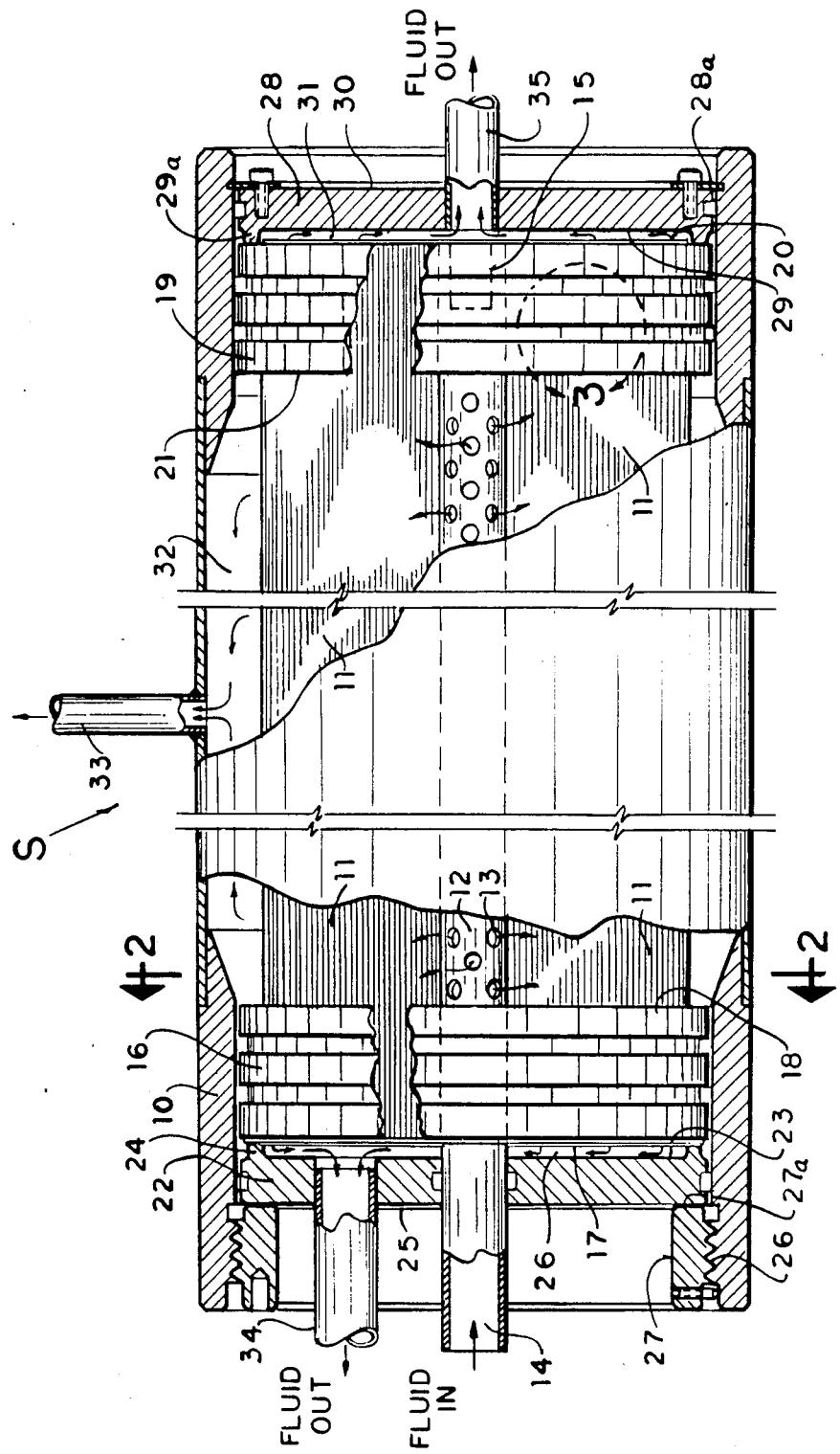
FIG. 1 is an elevation view, mostly in section, of one embodiment of the fluid separator device of this invention.
Figure 2:
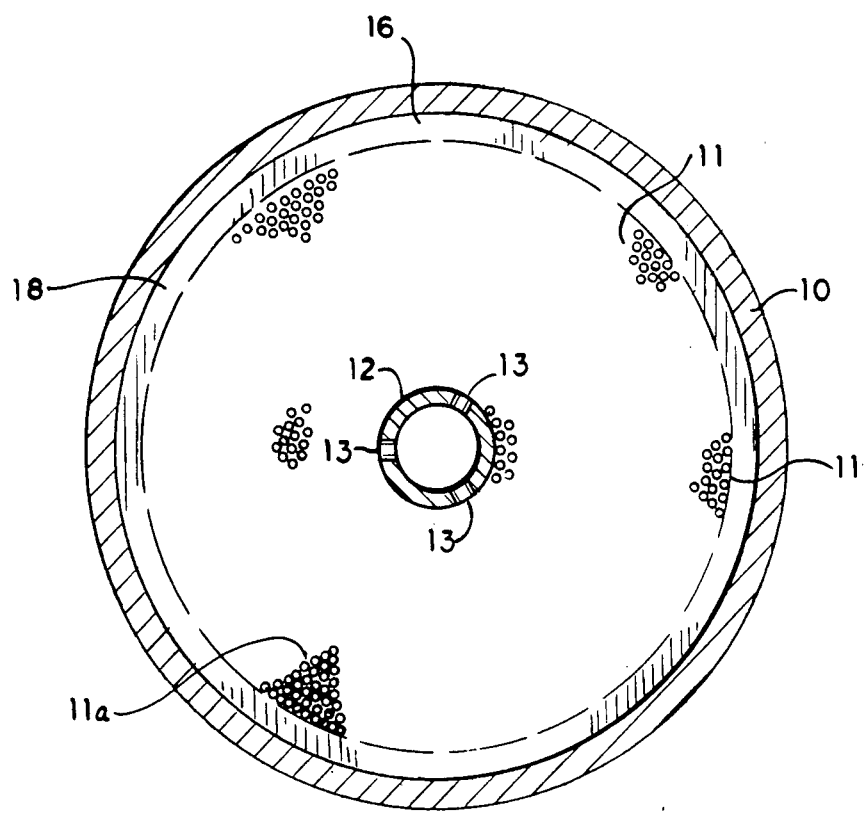
FIG. 2 is a view of the separator device, as taken on line 2—2 of FIG. 1.

In the drawings, referring particularly to FIG. 1, the fluid separator device of this invention is indicated generally by the letter S. The device includes a hollow fiber module that fits inside an elongate housing 10. The module itself is made up of a bundle of hollow fibers arranged in side-by-side relation, with interstices between the fibers. Individual fibers in the bundle are designated by the numeral 11. Extending lengthwise through the center of the fiber bundle is a distributor tube 12, which is a length of tube with numerous perforations 13 in it. The distributor tube 12 is open at one end, as indicated by numeral 14, and is closed off by a plug 15 at the opposite end.

At each end of the bundle, the fibers 11 are potted with a solid body of resin that defines a tubesheet. One of the tubesheets, indicated by numeral 16, is at the left-hand end of the fiber bundle, as shown in FIG. 1. Numeral 17 refers to the outside face of this tubesheet, and the inside face is indicated by numeral 18. At the other end of the fiber bundle is a tubesheet 19, which has an outside face 20 and an inside face 21. The separator device S includes a member referred to as a movable flange 22, that fits inside housing 10, and it can move back and forth inside the housing. One side of flange 22 is a flat surface defining an inside face 23 that includes an integral rib member 24. On the opposite side of this flange is a flat surface that defines an outside face 25.

As shown in the drawing, the rib member 24 is in contact (seats against) the outside face 17 of tubesheet 16. Also, a space 26 is defined between the tubesheet face 17 and the part of flange face 23 that is not occupied by rib 24. Adjacent to flange 22, inside housing 10, is an internal thread segment 26. An adjustment ring 27 has external threads which engage the thread segment 26. The ring has an inside face 27a in contact with the outside face 25 of flange 22. Ring 27 can thus be moved forward or backward to adjust the position of the flange relative to tubesheet 16. At the other end of the separator device S is a stationary flange 28, that is held in place in housing 10 by a lock ring 28a. The surface of flange 28 adjacent to the outside face 20 of tubesheet 19 is an inside face 29; the opposite surface is an outside face 30. At the periphery of face 29 is an integral rib 29a, which is in contact with the outside face 20 of the tubesheet. A space 31 is defined between the tubesheet face 20 and the part of the flange face 29 that isn't occupied by rib 29a.

The bundle of hollow fibers 11 is positioned in housing 10 such that a space 32 is defined between the external surface of the bundle and the inside surface of the housing. The nonpermeate fluids are carried out of the separator device S through one or more fluid outlets. The actual number of outlets used for this purpose depends on the flow rate of the nonpermeate fluids, and other conditions. As shown in FIG. 1, a single outlet 33, located in housing 10, is provided for carrying the nonpermeate fluids out of the separator device.

The permeate fluids are carried out of the separator device S by fluid outlets at each end of the device. One of these outlets, indicated by numeral 34, extends through the movable flange 22 and communicates with the space 26 between the flange and tubesheet 16. The other outlet, indicated by numeral 35, extends through the stationary flange 28 and communicates with space 31 between tubesheet 19 and face 29 of the flange. As shown in FIG. 1, there are O-ring seals on tubesheet 16 and flange 22. At the opposite end of the separator device S, there are O-ring seals on tubesheet 19 and flange 28. These seals (not numbered) prevent fluids from leaking past the tubesheets and the flanges to the outside of the separator device.

OPERATION

To illustrate the practice of this invention, a typical operation of the fluid separator device will now be described. In this operation a stream of compressed air is passed into the separator device S to separate oxygen ($O_2$) from nitrogen ($N_2$), and thus provides a separate stream of enriched $O_2$ and $N_2$. To start the operation, the stream of air to be separated into its $O_2$ and $N_2$ components is passed into the open end 14 of distributor tube 12 at high pressure. For the practice of this invention, the air stream should be at a pressure of foam about 10 to 1000 pounds per square inch absolute (psia). The preferred range is from about 70 to 175 psia.

Figure 3:
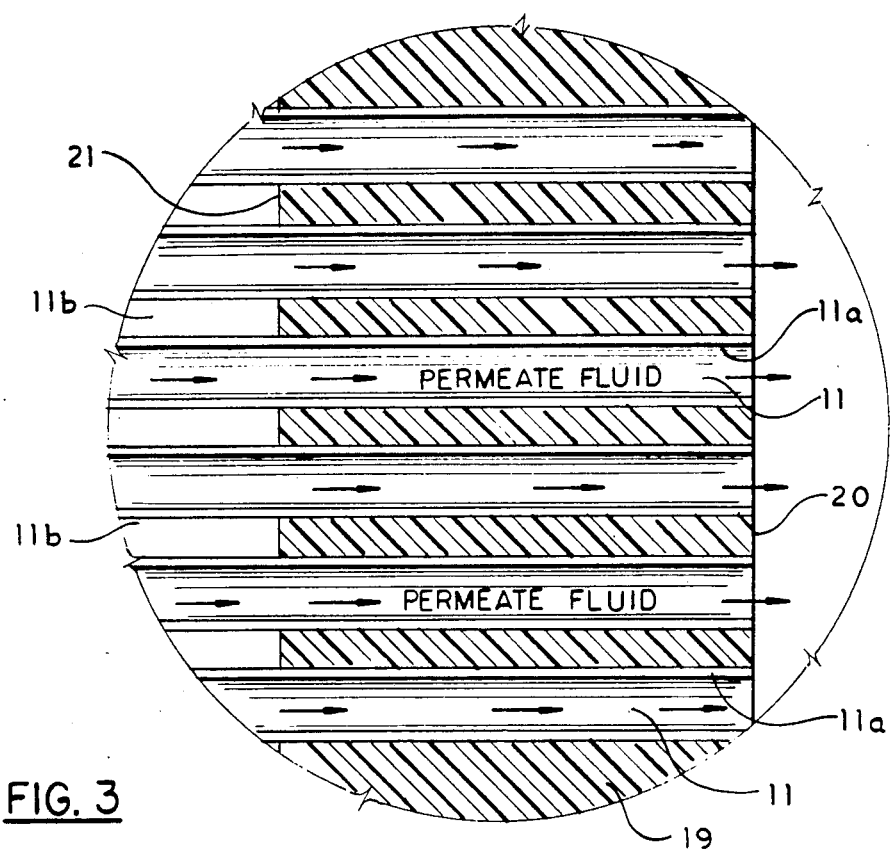
FIG. 3 is a detail view of one section of the separator device, as indicated by the circular line in FIG. 1.
Figure 4:
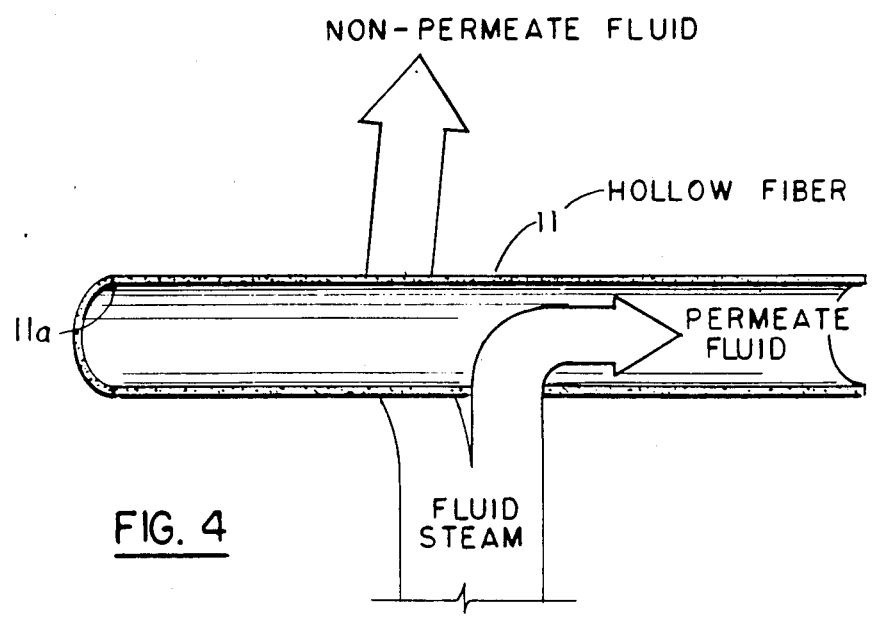
FIG. 4 is a fragmentary schematic view of a hollow fiber component of the separator device. This view illustrates how the hollow fibers separate permeate fluids from nonpermeate fluids in the practice of this invention.

From the distributor tube 12, the air passes out into the fiber bundle through the perforations 13 in the tube. As the air moves through the bundle, the $O_2$ readily permeates the walls of the fiber bundle 11 and is carried through the bore 11a of each fiber (as shown in FIGS. 3 and 4 of the drawing) toward both ends of the separator device. At one end, the $O_2$ moves through tubesheet 16 and space 26 and out of the separator device through outlet 34. At the other end, the $O_2$ passes through tubesheet 19 and space 31 and leaves the separator device through outlet 35. As the oxygen-enriched air leaves the separator device, it can be collected, or carried to a point of use, by conventional means known to the art.

The structure of the hollow fibers 11 is such that the $N_2$ in the compressed air doesn't readily permeate the fiber walls. Instead, the $N_2$ bypasses the fibers, so that it moves through the interstices 11b (spaces) between the fibers, into the space 32, and passes out of the separator device through fluid outlet 33. The $N_2$ component can also be collected or carried to a point of use, as is done with the oxygen-enriched air.

As described earlier, the adjustment ring 27 can be moved forward or backward on the thread segment 26. The ring can thus hold movable flange 22 tight against the outside face 17 of tubesheet 16, and thereby counterbalance the pressure load against the inside face 18 of tubesheet 16. The ability to move flange 22 to different positions also has the advantage that it can be used with hollow fiber modules having different lengths. The pressure load acting against tubesheet 19 is resisted by stationary flange 28, in which rib 29a seats against the outside face 20 of the tubesheet.

In the practice of this invention, suitable materials for the polyolefinic hollow fibers include the acetate, triacetate, propionate, nitrate and other cellulose esters, including the mono-, di- and triesters and mixtures of such esters; cellulose esthers, such as methyl, ethyl, hydroxy-alkyl, etc; regenerated cellulose; polyvinyl alcohols; polysaccharides, and the like. The separator device described herein is useful for separating any of several fluids from a mixture of fluids, as determined by the specific properties of the hollow fibers.

The practice of this invention also includes situations in which it may be desirable to reverse the sequence in which the fluid mixture (which is to be separated into individual components) is fed into the separator device. For example, referring to FIG. 1, if the fluid is air, the air is passed into the separator device S through outlet 33, and the nonpermeate fluid ($N_2$) leaves the separator through the open end 14 of distributor tube 12. But, the permeate fluid ($O_2$) permeates the walls of the fibers in bundle 11 and the $O_2$ is carried out of the separator device through the outlets 34 and 35. This embodiment would also include the movable flange 22 and stationary flange 28, to compensate for the pressure load against the tubesheets 16 and 19.

As now illustrated in FIG. 1, the movable flange 22 is positioned at the left end of the separator device S, so that it is in contact with and provides support for the tubesheet 16. The separator device can function equally well by positioning flange 22 at the other end (the right end) of the device, so that it provides support for tubesheet 19. In such an embodiment, the stationary flange 28 would be positioned at the left end of the separator device, to provide support for tubesheet 16.

The invention claimed is:

1. A hollow fiber device for separating individual fluids from a fluid stream that contains a mixture of permeate fluids and nonpermeate fluids, the device comprises:

an elongate housing;

a hollow fiber module that includes an elongate, perforated, distributor tube;

the distributor tube has an open end and a closed end, the tube is enclosed by a bundle of spaced-apart hollow fibers, and the tube is adapted for carrying a fluid stream into the fiber bundle the fibers are fastened into a first tubesheet at one end of the bundle, the fibers are fastened into a second tubesheet at the opposite end of the bundle, each tubesheet is fabricated of a resin material, and each tubesheet has an inside face and an outside face;

the separator device includes a movable flange that fits inside one end of the housing, the movable flange can move forward and backward inside the housing, it has an inside face and an outside face, the inside face includes a rib member in contact with the first tubesheet, and a space is defined between the inside face of the movable flange and the outside face of the first tubesheet;

the separator device includes an adjustment ring, the ring has external threads that engage internal threads in the housing adjacent to the movable flange, the ring has an inside face in contact with the outside face of the movable flange, and the ring can move backward and forward inside the housing, so that it can adjust the position of the movable flange;

the separator device includes a stationary flange that fits inside the housing at the end opposite from the movable flange, the stationary flange has an inside face and an outside face, the inside face includes a rib member in contact with the second tubesheet, and a space is defined between the inside face of the stationary flange and the outside face of the second tubesheet;

the hollow fiber bundle is positioned inside the elongate housing, such that a space is defined between the external surface of the bundle and the inside surface of the housing;

the separator device includes at least one first fluid outlet located in the elongate housing, said outlet communicates with the space between the fiber bundle and the housing;

the separator device includes at least one second fluid outlet that extends through the movable flange and communicates with the space between the inside face of the movable flange and the outside face of the first tube sheet;

the separator device includes at least one third fluid outlet that extends through the stationary flange and communicates with the space between the inside face of the stationary flange and the outside face of the second tubesheet;

wherein, the fluid stream containing permeate and nonpermeate fluids is directed into the open end of the distribution tube at a pressure of from about 10 to about 1000 psia;

the permeate fluid flows from the distributor tube through the walls of each hollow fiber and is carried out by the separator device through the second and third fluid outlets; and the nonpermeate fluid flows from the distributor tube through the spaces between the hollow fibers in the bundle, and is carried out of the separator device through the first fluid outlet.

2. A method for separating individual fluids from a fluid stream that contains a mixture of permeate fluids and nonpermeate fluids, comprising the steps of:

placing a bundle of spaced-apart hollow fiberes inside an elongate housing, to define a separator device;

installing an elongate, perforated distributor tube in the center of the hollow fiber bundle;

fastening each hollow fiber into a first tube sheet at one end of the fiber bundle, and into a second tubesheet at the opposite end of the fiber bundle;

cutting an internal thread segment into one end of the housing;

placing a flange inside the housing adjacent to the internal thread segment, said flange is movable forward and backward inside the housing;

providing an adjustment ring having external threads which can engage the internal thread segment;

threading the adjustment ring into the housing to the point where it contacts the movable flange, and thereafter moving the adjustment ring forward or backward to thereby adjust the position of the movable flange;

installing a stationary flange inside the housing at the end opposite from the movable flange, such that the flange is in contact with the second tubesheet;

installing a first fluid outlet in the housing, said outlet communicates with a space between the fiber bundle and the housing;

installing a second fluid outlet in the movable flange, said outlet communicates with a space between the movable flange and the first tubesheet;

installing a third fluid outlet in the stationary flange, said outlet communicates with a space between the second tubesheet and the stationary flange;

directing the fluid stream containing the permeate and nonpermeate fluids into the distributor tube at a pressure of from about 10 to about 1000 psia;

flowing the permeate fluid from the distributor tube through the walls of each hollow fiber, and carrying said fluid out of the separator device through the second and third fluid outlets; and flowing the nonpermeate fluid through the spaces between the hollow fibers in the bundle and carrying said fluid out of the separator device through the first fluid outlet.

3. The method of claim 2 in which a stream of air is directed into the distributor tube, and the air contains oxygen as a permeate fluid, and nitrogen as a nonpermeate fluid.

* * * * *